United States Patent [19]

van Heel et al.

[11] 4,060,391

[45] Nov. 29, 1977

[54] APPARATUS FOR PRECIPITATING AND SEPARATING A MATERIAL IN A SOLID FORM FROM A GASEOUS MIXTURE

[75] Inventors: Hubertus Johannes Gerardus van Heel, Vriezenveen; Victor Leonard Bruins; Joost Smid, both of Alkmaar, all of Netherlands

[73] Assignee: Ultra-Centrifuge Nederland N.V., The Hague, Netherlands

[21] Appl. No.: 750,628

[22] Filed: Dec. 15, 1976

[30] Foreign Application Priority Data

Dec. 19, 1975 Netherlands .......................... 7514821

[51] Int. Cl.$^2$ .......................... B01D 7/00; B01D 5/00
[52] U.S. Cl. .................................. 23/264; 23/294 R; 55/269; 165/61; 165/101
[58] Field of Search ..................... 23/294, 264; 55/269; 165/61, 103, 100, 102

[56] References Cited

U.S. PATENT DOCUMENTS

| 543,811 | 7/1895 | Pellet | 165/61 |
| 1,464,844 | 8/1923 | Downs | 23/294 |
| 1,661,104 | 2/1928 | Barnebey | 55/269 |
| 2,706,620 | 4/1955 | Graves | 165/61 |
| 3,429,904 | 2/1969 | Eisentraut | 23/294 |
| 3,869,479 | 3/1975 | Barth | 165/61 |

FOREIGN PATENT DOCUMENTS

| 220,601 | 1962 | Austria | 23/294 |
| 556,334 | 10/1957 | Belgium | 23/294 |
| 1,172,165 | 11/1969 | United Kingdom | 23/294 |

*Primary Examiner*—S. J. Emery
*Attorney, Agent, or Firm*—Cushman, Darby & Cushman

[57] ABSTRACT

An apparatus for precipitating and separating a material in a solid form from a gaseous mixture. The substance which is settling in solid form can be very simply prevented from accumulating near the inlet by providing at least one channel with at least one controllable bypass.

3 Claims, 3 Drawing Figures

APPARATUS FOR PRECIPITATING AND SEPARATING A MATERIAL IN A SOLID FORM FROM A GASEOUS MIXTURE

The application relates to an apparatus for precipitating and separating a material in a solid form from gaseous mixture, which apparatus consists of an elongate vessel furnished with at least two gas connections, i.e., at one end an inlet and at the other end an oulet for gas, as well as with channels that are equipped with a heat-transferring surface, which channels are suitable for conveying a cooling medium and a heating medium, respectively, these channels being attached to a wall of the aforementioned vessel.

Apparatus of this nature is already known. An example is constituted by the published Netherlands patent application No. 71-17,037. The present invention aims at improving such an apparatus.

Applicant has found that the substance which is settling in solid form can be very simple prevented from accumulating near the inlet. This is achieved according to the invention by providing at least one channel with at least one controllable bypass.

Such a bypass can be made controllable, for example, by including a controllable closing element either in the bypass itself or in a branch thereof. By adjusting such a closing element to various positions, the flow which passes through it can be throttled to a greater or lesser extent, thus allowing the flow along the heating or the cooling surface to be influenced. This makes it possible for the temperature distribution along the wall of the apparatus to be obtained in a desired manner.

It has been found that undesired accumulations of precipitated material can be prevented very efficiently by supplying slightly more heat to those places where the threat of such accumulation arises, or by keeping a slightly larger quantity of the cooling medium away from the wall by causing it to flow through a bypass.

Another method for attaining substantially the same effect consists in providing a pipe-line which comprises a regulating element for connecting, in at least one place, a channel for a heating medium to a channel for a cooling medium. It will be effective to design these channels in such a way that the heating medium and the cooling medium, respectively, can circulate in counterflow along the wall of the apparatus.

This connecting line can be fitted, for example, near the gas inlet of the apparatus, the heating medium also being supplied on that side, while the cooling medium is supplied at the other end of the apparatus. In this manner, the pattern of pressure along the cooling coils can be of such a nature that, the supply pressure at the ends being the same, opening of the regulating element in the connecting line will result in heating medium being added to the cooling coil around the inlet of the apparatus, so that the temperature at that point will rise.

According to a further improvement, the precipitated substance is gasified by adequate heating of the desublimer, and discharged in gaseous form. This is accomplished by allowing a discharge line to be connected by way of at least one of the gas connections to the core of the vessel.

An example of embodiment of the invention will be explained in further detail on the basis of the following figures, of which:

Figure 1:
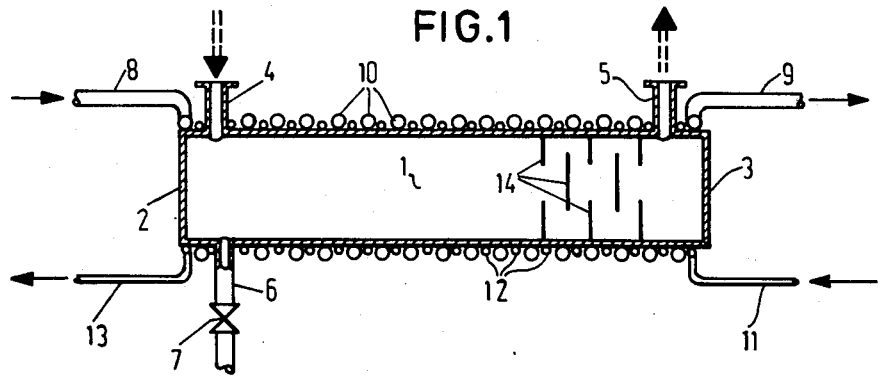
FIG. 1 is a diagrammatic longitudinal sectional view of an apparatus according to the invention, with coils for heating and cooling medium fitted around it.
Figure 2:
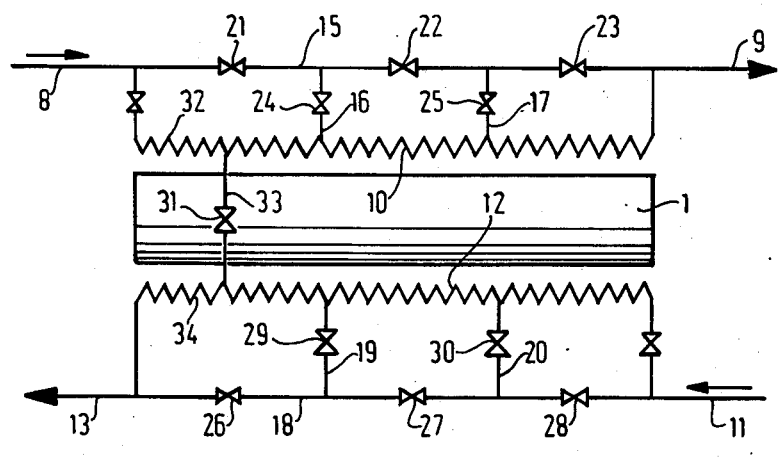
FIG. 2 is a diagrammatic representation of the two aforementioned coils, with closing elements provided in the bypasses, the branches and the connecting line.

In FIG. 1, the number 1 indicates a desublimer, which has substantially the form of an elongate cylinder which is closed at both ends with lids 2 and 3. The number 4 indicates the inlet for the gaseous mixture, called the product, and 5 indicates the outlet for the residual gas. A drain pipe 6, equipped with a closing element 7, serves for removing molten precipitated substance from vessel 1 in accordance with requirements. A heating medium is supplied through line 8 and discharged through line 9. Between 8 and 9, this heating line is wound as a coil 10 about the outer jacket of the desublimer. A cooling medium is supplied through the line 11, the extension of which is formed by the cooling coils 12, and eventually leaves the apparatus through line 13. The number 14 indicates a number of baffle plates which are arranged just before the discharge branch 5. FIG. 1 is a simplificatiion insofar as no bypasses and regulating elements are shown. These components can be seen in FIG. 2, described below.

FIG. 2, the number 1 again indicates the desublimer, with the heating coil 10 above it and the cooling coil 12 below it. Naturally, these coils are in actual fact wound about the vessel. The heating coil possesses a bypass 15, along with two branch pipes 16 and 17. Similarly, the cooling line 11 which connects to the coil 12 is provided with a bypass 18 and with two branch pipes 19 and 20. Regulating elements 21 through 25 can be arranged in the system of heating lines, and regulating elements 26 through 30 can be arranged in the bypass of the cooling medium as well as in the branch lines thereof. These closing elements do not all have to be provided at the same time. In many cases it will be sufficient to install just a few of them.

A connecting line 33 is furthermore provided to interconnect the heating coil 10 and the cooling coil 12. This line also comprises a closing element 31.

The heat supply to the wall of the desublimer can be apportioned in several manners. It is possible, for example, to close the regulating element 21 or to throttle it, while the regulating elements 22 through 25 remain opened. In this case, the flow of heating medium will be concentrated mainly on the area 32 of the heating coil. Furthermore, the stop valves 27 and 28 in the line of cooling medium can be closed, while the valves 26 and 29 are opened. In that case, the cooling medium flows only to a small extent through the coil area 34. Finally, the stop valve 31 can be opened, causing heating medium to flow from coil 32 to coil 34 and to be mixed with the cooling medium contained in the latter.

As has been mentioned under the description for FIG. 1, the product can be liquefied by suitable heating and thereupon discharged through the drain pipe 6.

Figure 3:
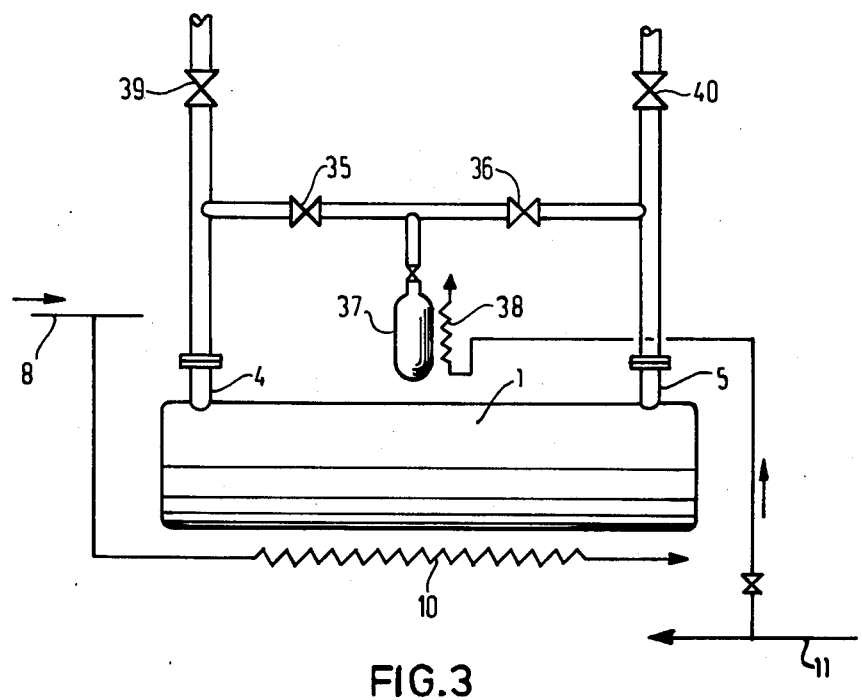
FIG. 3 shows diagrammatically the pipe-lines for removing the product in gaseous form.

Another highly suitable method for the removal of product is shown in FIG. 3. In this case, the vessel is so heated with the use of coil 10 that the product is gasified and can be conveyed—through the branch 4 and the opened stop valve 35, and/or through the branch 5 and the opened stop valve 36—to a product reservoir 37, which can be uncoupled and sealed and which is maintained at a lower temperature than the vessel 1 with the use of a cooler 38. The stop valves 39 and 40 are closed during this process of discharge.

We claim:

1. Apparatus for precipitating and separating a material in solid form from a gaseous mixture comprising: an elongated vessel having a gas inlet connection at one end and a gas outlet connection at the other end; at least one cooling coil for conveying a cooling fluid, said cooling coil extending along at least a portion of the length of the vessel and being attached to a wall of the vessel; at least one heating coil for conveying a heating fluid said heating coil extending along at least a portion of the length of the vessel and being attached to a wall thereof, said coils being wrapped around the exterior of the vessel, with the convolutions of the cooling coil alternating with the convolutions of the heating coil and arranged to convey their fluids in counterflow relation, each of said coils including a controllable bypass by means of which the fluid being conveyed may be bypassed around a portion of the respective coil, said portion being less than the entire length of the respective coil, and a connecting pipe line provided with a flow-regulating element and connecting the two coils at a location intermediate their ends a fluid supply line connected to one end of each coil and a fluid discharge line connected to the other end of each coil, the controllable bypass for each coil including a valved bypass line connected between the respective supply and discharge lines and valved branch lines connecting spaced-apart locations along the length of the bypass line with spaced-apart locatons along the length of the respective coil.

2. Apparatus as in claim 1 including a pipe line provided with a fluid flow closure means and connected to the interior of the vessel for discharging precipitated material in gaseous form through at least one of the gas connections.

3. Apparatus as in claim 1 wherein the gas inlet connection and the gas outlet connection each comprise a conduit containing a valve, said apparatus further including a pipe connecting with at least one of said conduits at a location between the respective valve and the vessel and connecting with a reservoir, and means for cooling the reservoir.

* * * * *